United States Patent
Torii et al.

[11] Patent Number: 5,534,918
[45] Date of Patent: Jul. 9, 1996

[54] IMAGE PROCESSING APPARATUS FOR DISPLAYING IMAGES ON LEFT AND RIGHT DISPLAY SCREENS

[75] Inventors: Tetsuo Torii; Kiyokazu Mizoguchi, both of Hiratsuka, Japan

[73] Assignee: Kabushiki Kaisha Komatsu Seisakusho, Tokyo, Japan

[21] Appl. No.: 318,736

[22] PCT Filed: Apr. 15, 1993

[86] PCT No.: PCT/JP93/00480

§ 371 Date: Oct. 13, 1994

§ 102(e) Date: Oct. 13, 1994

[87] PCT Pub. No.: WO93/21737

PCT Pub. Date: Oct. 28, 1993

[30] Foreign Application Priority Data

Apr. 15, 1992 [JP] Japan .................... 4-095486

[51] Int. Cl.⁶ .................................. H04N 13/00
[52] U.S. Cl. .................................. 348/53; 348/47
[58] Field of Search .................................. 348/211, 214, 348/51, 53, 54, 78, 115, 43, 46, 47

[56] References Cited

U.S. PATENT DOCUMENTS 4,647,965  3/1987  Imsand .................... 348/47
4,723,160  2/1988  Connelly .................... 348/115 X
4,884,219  11/1989  Waldren .................... 348/53 X
4,994,794  2/1991  Price et al. .................... 348/53 X

*Primary Examiner*—Wendy Greening
*Attorney, Agent, or Firm*—Diller, Ramik & Wight

[57] ABSTRACT

An image processing apparatus capable of displaying an object on right and left screens so that the object an be visually examined as usually seen by the naked eye. When visual examination positions of right and left displays (1, 2) are detected by eye cameras (3, 4), the visually examined object (WK) on the screens (1, 2) is specified on the basis of the detected visual examination positions. A position of the object (WK) on one screen (1a) is fixed and an entire image including the object (WK) is shifted on the other screen (2a) so that a position of the object (WK) on the other screen (2a) becomes the same to the fixed position on the one screen (1a). A processing is performed to darken a portion of the screen (2a) which is not displayed on the screen (2a) before the image shifting and is displayed on the screen (2a) as a result of the image shifting, and also to darken a portion of the screen (1a) corresponding to the darkened part of the screen (2a) so that the corresponding part is also darkened. The display units (1, 2) are attached to a head of a visually examining operator with use of a predetermined supporting member in such a manner that distances between the screens (1a, 2a) and the operator's left and right eyes are kept constant.

6 Claims, 4 Drawing Sheets

IMAGE PROCESSING APPARATUS FOR DISPLAYING IMAGES ON LEFT AND RIGHT DISPLAY SCREENS

TECHNICAL FIELD

The present invention relates to a visual apparatus for remote control, remote operation or the like.

BACKGROUND ART

Conventionally, there has been well known a visual apparatus which is not arranged to visually examine an object directly with operator's eyes, but is arranged to display left and right images of the object picked up by left and right cameras on the respective screens of left and right displays for the operator to visually examine the object on the left and right screens. With such an apparatus, even in a case where it is necessary for an operator to be at a location far away from an object at a dangerous working site, for example, the operator can control and operate the visual apparatus as if he operates with the direct visual examination of the object with his eyes.

The direct visual examination of an object by an operator and the visual examination by the above visual apparatus will be explained by referring to FIGS. 4 and 5.

First, as shown in FIG. 4, an operator can gaze at a center position C of a work WK1 by adjusting a parallax $\theta_1$-$\theta_2$ of left and right eyes. In this case, angles $\theta_1$ and $\theta_2$ and the parallax vary depending on distances from the operator's eyes to the work WK1, however, the human's eyes unconsciously perform the adjustment. When the operator gazes at a center position D of a work WK2, such adjustment is performed similarly.

Meanwhile, in the case of the visual examination by the visual apparatus as shown in FIG. 5, the distances 11 and 12 between left and right cameras 21 and 22 and the center position C of the work WK1 are measured, and on the basis of the measured distances, the pick-up directions of the left and right cameras 21 and 22 are changed to the directions shown by arrows A and B to vary a parallax between the left and right cameras similar to the human eyes' parallax. In this case, the pick-up images taken by the left and right cameras 21 and 22 are displayed on screens 23a and 24a of display units 23 and 24 which correspond to human's left and right eyes, as shown in FIGS. 6(a) and 6(b).

As shown in FIGS. 6(a) and 6(b), when an X axis is set in a horizontal direction, the center position C of the work WK1 is located at an identical center position XC of the screens 23a and 24a. For this reason, so long as the operator's gazing point is on the work WK1, the left and right images coincide with each other, and thus the operator can visually examine the work naturally and without the sense of, fatigue, uncomfortableness and inconsistency as same to a situation where the operator visually examines the work with naked eyes.

However, there occurs such a case that the operator observes another object, for example, the work WK2 being displayed on the screen. In this case, the parallax of the left and right cameras 21 and 22 has been adjusted with respect to the work WK1 but not the work WK2, which results in that the center position D of the work WK2 on the left screen 23a is different from that on the right screen 24a, that is, the center positions D on the left and right screens 23a and 24a are displayed at different positions X1 and X2 (>X1). The distance measurement is carried out with respect to a predetermined single point on the image that is usually different from the operator's observation point.

Accordingly, when the visual examination point is on the work WK2, the left and right images do not coincide with each other and the situation is different from the case when the operator observes the work with the naked eyes, so that the operator feels tired and uncomfortable and will visually examine the work with the sense of inconsistency. This involves such disadvantages as a deteriorated remote operation efficiency. With the conventional visual apparatus, since the distances between the cameras and object are measured and the parallax at the left and right camera sides is adjusted on the basis of the measured result, a device cost is involved for the distance measurement.

In view of the above circumstances, it is an object of the present invention to provide a visual apparatus which is so arranged that, even when an operator observes a given position on a screen, a visual examination without the sense of inconsistency can be performed to thereby improve a working efficiency to reduce the device cost without performing the distance measurement.

DISCLOSURE OF THE INVENTION

In accordance with the present invention, there is provided a visual apparatus in which an image of an object picked up by left and right image-pick-up devices is displayed on respective screens of left and right display units, for visual examination of the object on the left and right screens by operator's left and right eyes, which comprises visual examination position detection means for detecting visual examination positions on the left and right screens respectively; and image processing means, on the basis of a detection result of the visual examination position detection means, for shifting the image on one of the left and right screens so that the object visually examined on one screen is located at a position corresponding to a visual examination position on the other screen.

With such an arrangement as mentioned above, the visual examination positions on the left and right screens are detected. And the image on one of the left and right screens is shifted on the basis of the detection result so that the object visually examined on one screen is located at the position corresponding to the visual examination position on the other screen. As a result, the positions of the object being observed become the same positions on the left and right screens, and thus the operator can visually examine the object without sense of inconsistency as same to the visual examination with naked eyes.

BEST MODE FOR CARRYING OUT THE INVENTION

An embodiment of a visual apparatus in accordance with an embodiment of the present invention will be explained with reference to the accompanying drawings.

Figure 1:
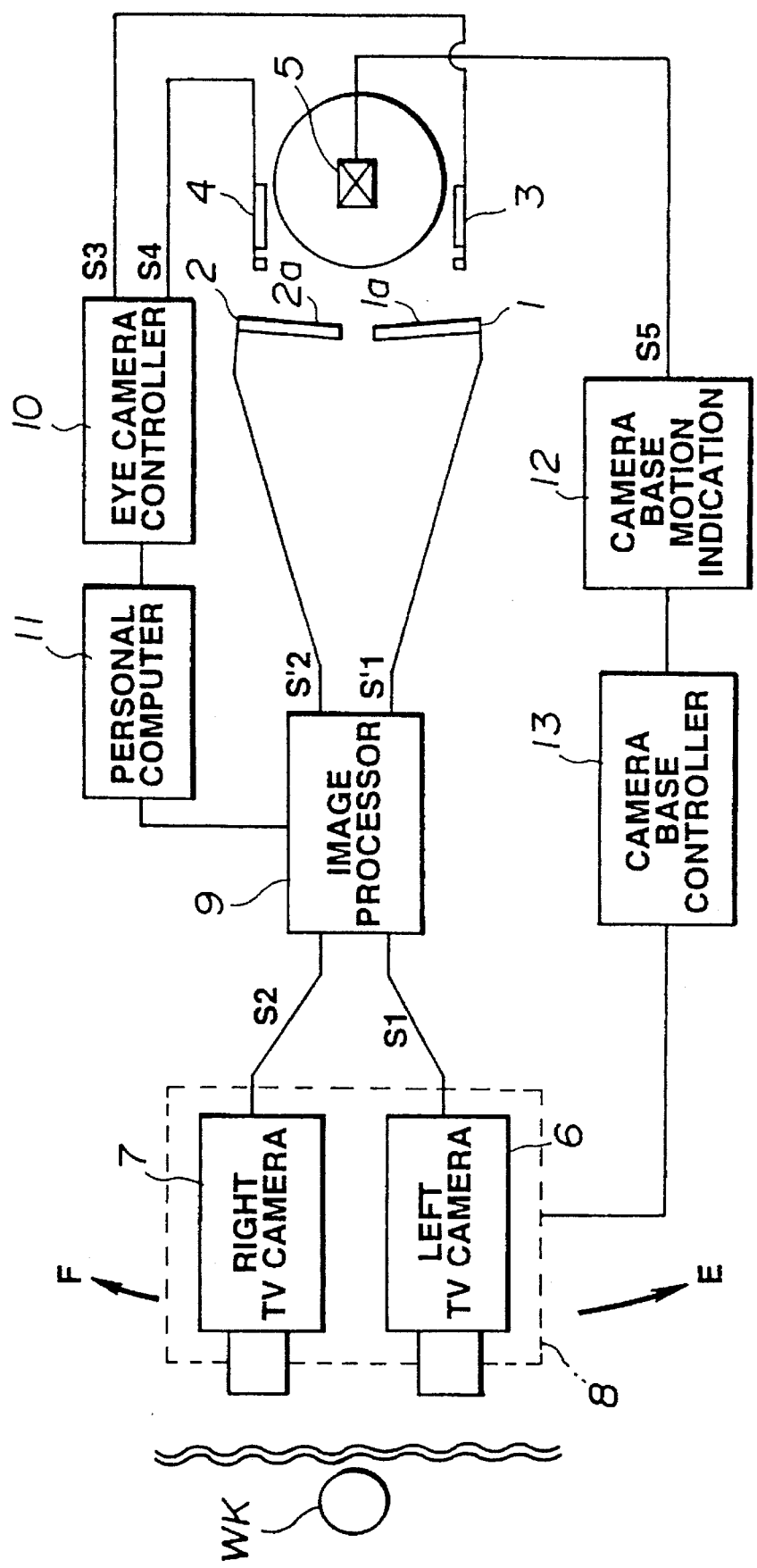
FIG. 1 is a block diagram of an arrangement of a visual apparatus in accordance with an embodiment of the present invention.

FIG. 1 conceptionally shows an arrangement of the embodiment apparatus.

Figure 2:
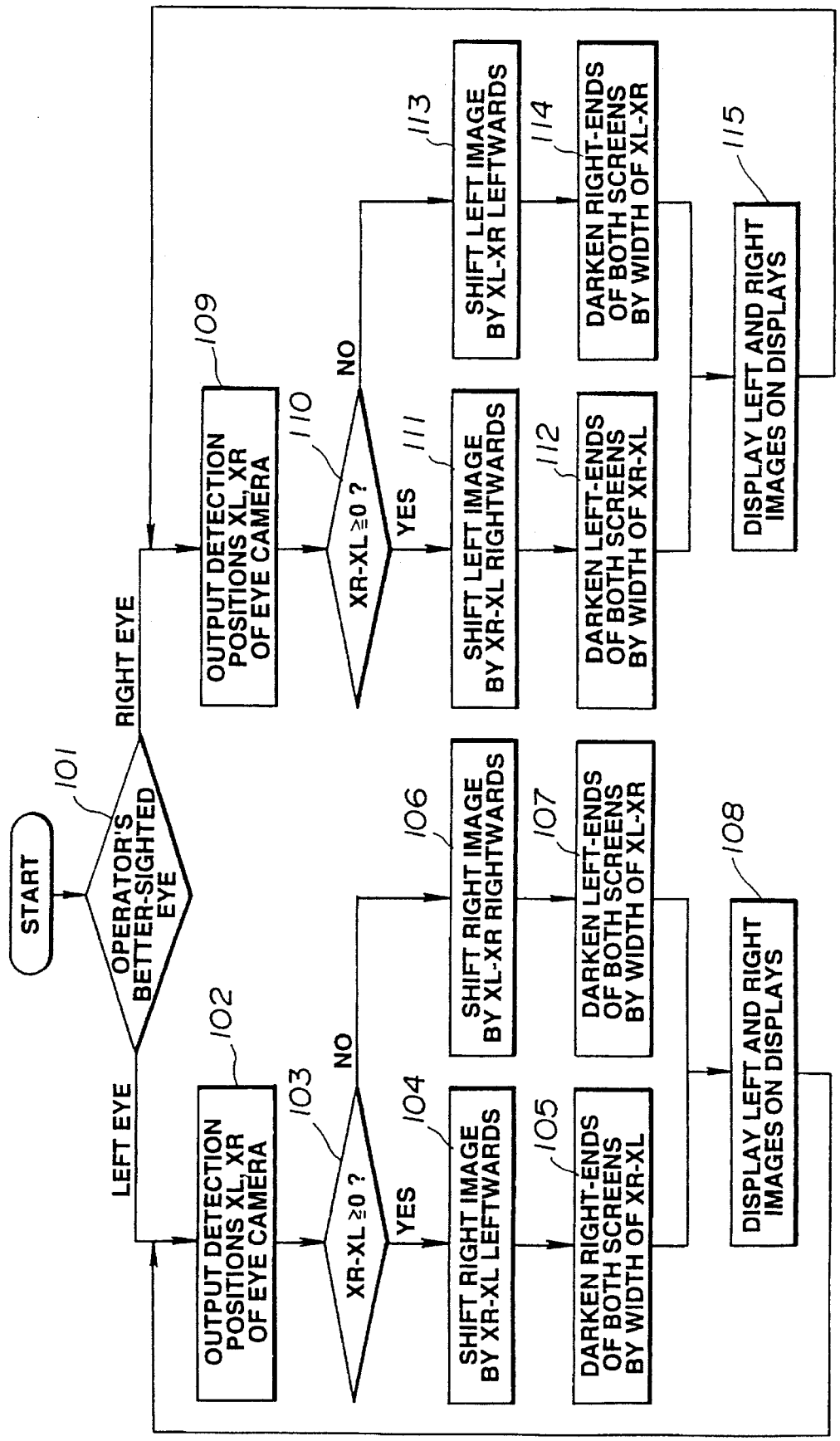
FIG. 2 is a flowchart for explaining an example of procedure of processing performed in an image processor in FIG. 1.

As shown in the drawing, left and right TV cameras 6 and 7 are fixedly mounted on a camera base 8 as spaced from each other by a predetermined distance in their left and right directions. The left and right cameras 6 and 7 take pictures of a work WK (and another object (not shown)) present in their picture-taking directions. As the left and right cameras 6 and 7, any type of image pick-up device such as an infrared TV camera can be used. Signals S1 and S2 indicative of images taken by the left and right cameras 6 and 7 are applied to an image processor 9 to be subjected to such processing (see FIG. 2) as to be explained later, and are outputted as display signals S'1 and S'2. Left and right display units 1 and 2, on the basis of the display signals S'1 and S'2, display left and right pick-up images respectively on left and right display screens 1a and 2a thereof.

The left and right display units 1 and 2 are attached to the head of an operator together with left and right eye cameras 3 and 4 with use of a predetermined supporting means (not shown). In this case, the display units are supported on the operator's head so that the left and right screens 1a and 2a are kept as spaced by a predetermined distance from operator's left and right eyes, whereby, even when the operator moves his or her head in any direction, the operator can visually examine the screens under the same condition.

The eye cameras 3 and 4, which function as sensors for detecting visual examination positions on the screens 1a and 2a based on the operator's left and right eyes respectively. S3 and S4 indicative of detection positions detected by the eye cameras 3 and 4 are applied to an eye camera controller 10. From the eye camera controller 10, the operator's visually examined positions on the screens 1a and 2a are outputted as coordinate positions X in the horizontal directions of the screens, and outputted to the image processor 9 through a personal computer 11. Also attached to the operator's head is a head motion sensor 5 for detecting a motion in left or right direction of the operator's head. A signal S5 indicative of the amount of motion is outputted to a camera base movement indicator 12. The camera base motion indicator 12 converts, in the engineering unit, the amount of the head's motion into the amount of the motion of the camera base 8. The signal converted into the amount of motion of the camera base 8 is then applied to a camera base controller 13.

The camera base controller 13 outputs a drive signal for driving the camera base 8 in the left or right direction E or F, in the forward or backward direction, and in the rotational direction in accordance with the inputted signal. As a result, by a not shown drive mechanism of the camera base 8, the camera base 8 is driven in the left or right direction E or F, in the forward or backward direction and in the rotational direction in accordance with the head's motion, which results in that a desired field of view of the operator can be captured by the left and right cameras 6 and Explanation will next be made as to the processing contents of the image processor by referring to a flowchart of FIG. 2 and explanatory diagrams of FIGS. 3(a) to 3(c).

First, data indicative of which one of eyes of the operator has a better eyesight is entered through a predetermined input device, for example, a keyboard of the personal computer 11. The operator overlaps at a gazing point images having parallax caught by operator's left and right eyes, at which time the operator fixes the image caught by one eye and overlaps the image caught by the other eye on the fixed-side image. In this case, the eye corresponding to the fixed image is "better-sighted eye" (step 101). Suppose now that operator's "better-sighted eye" is left one (judged "left eye" at a step 101).

Figure 3A:
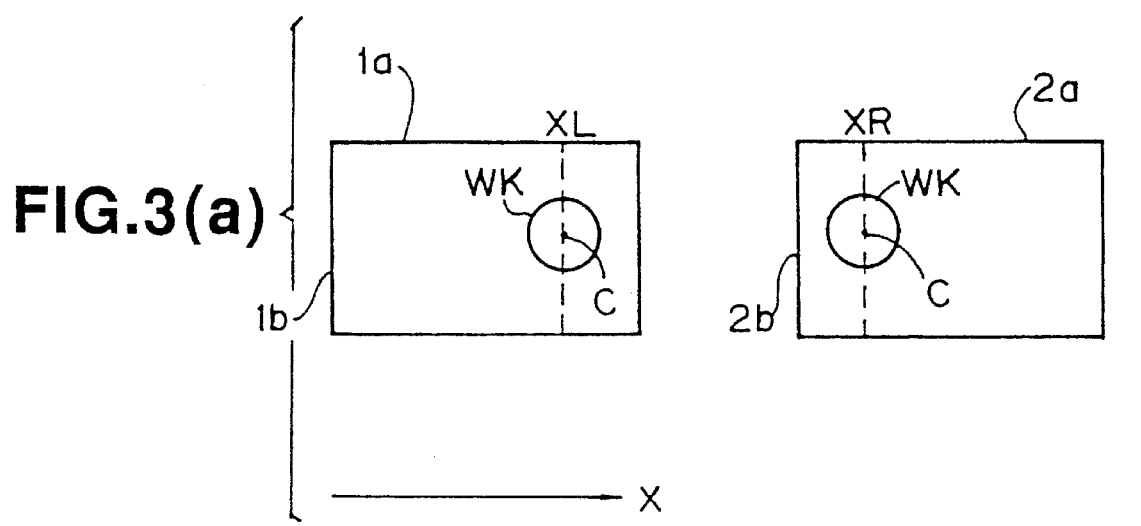
FIGS. 3(a) to 3(c) are diagrams for explaining the processing performed in the image processor in FIG. 1.

Next, the visual examination positions detected by the eye cameras 3 and 4 are outputted from the eye camera controller 10. Assume now that, as shown in FIG. 3(a), the origin of coordinate axis X is set respectively at left ends 1b and 2b of the screens 1a and 2a and the visual examination positions are expressed in terms of coordinate positions in the horizontal direction. When the operator gazes at a center position C of the work WK, a coordinate position XL on the left screen 1a and a coordinate position XR on the right screen 2a are outputted as the visual examination positions (step 102).

It is judged whether or not the detected positions satisfy the following relationship (1) (step 103).

$$XR-XL \geq 0 \qquad (1)$$

Figure 3B:
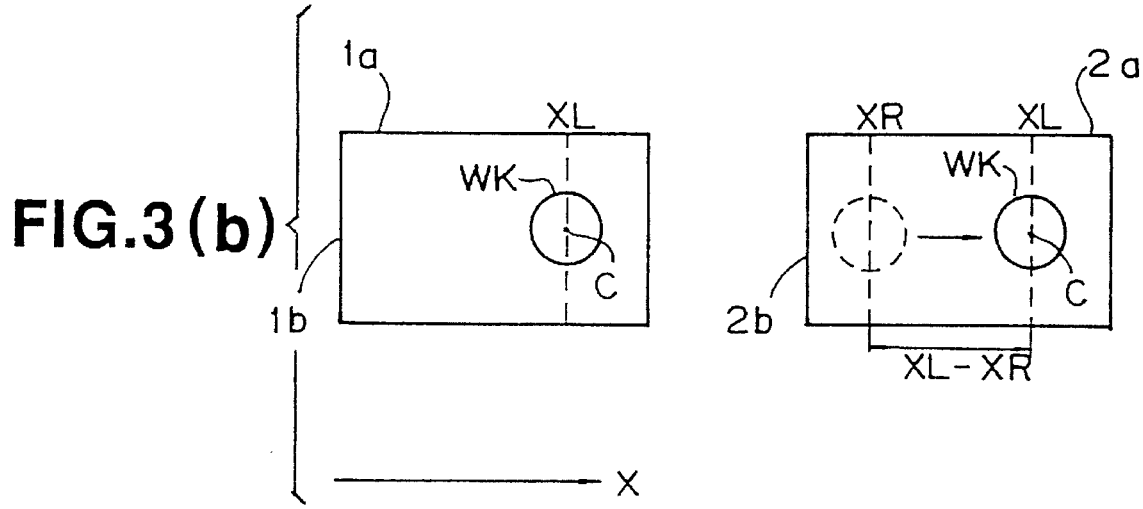

When the visual examination position XL of the left screen 1a is greater than the visual examination position XR of the right screen as shown in FIG. 3(a), this means that the above relationship (1) is not satisfied (judged YES at step 103). Then the process proceeds to step 106. Since the better-sighted eye is left one in the illustrated example, the image of the left screen 1a remains fixed and the image on the right screen 2a is shifted to the right side by a distance of XL-XR, that is, the center position C of the work WK is shifted to the same position XL as that of the left screen 1a as shown in FIG. 3(b). In this way, since the observation points become the same in the left and right positions, the operator can visually examine the object without the sense of inconsistency (step 106). Then a part 2b-2'b having the width of XL-XR (see FIG. 3(c)), which was outside the screen before the image shift and was made to be displayed within the right screen 2a as a result of the image shift, is displayed dark or black in color, i.e., the contrast of pixels is lowered because of the absence of any image to be displayed.

In order to balance with this, a corresponding part of the left screen 1a defined by lines 1b and 1'b and having the width of XL-XR is also darkened. As a result, the operator can visually examine the object naturally (step 107).

For convenience of explanation, FIGS. 3(a) and 3(b) have been explained as if the images are displayed on the screens. However, these are not able to be actually displayed on the screens but are processed in the form of signals at the image processor 9.

Figure 3C:
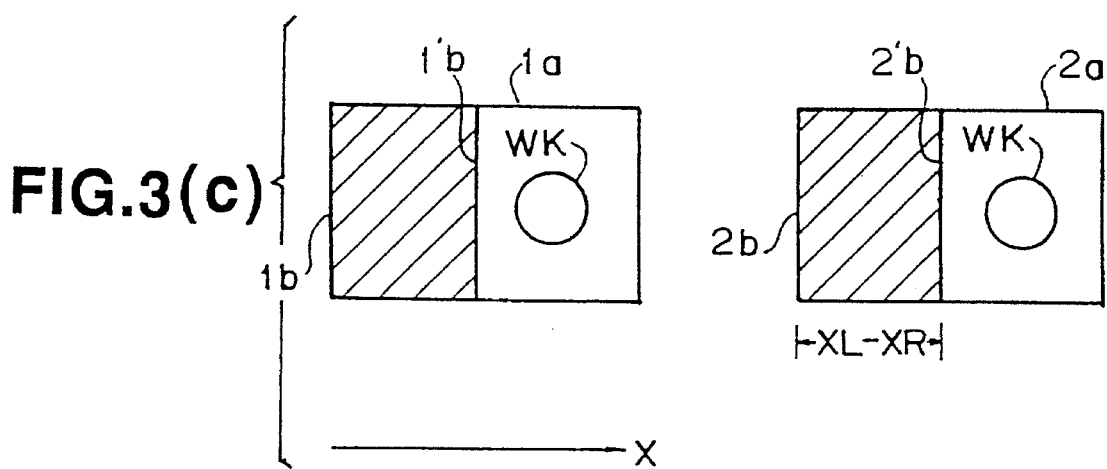
Figure 4:
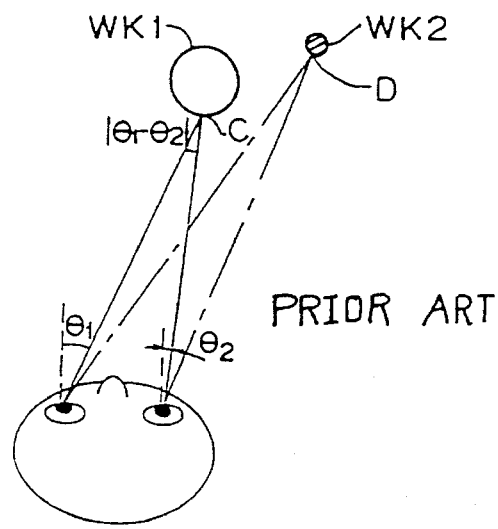
FIG. 4 is a diagram for explaining a prior art technique of visual examination of an object by a human.
Figure 5:
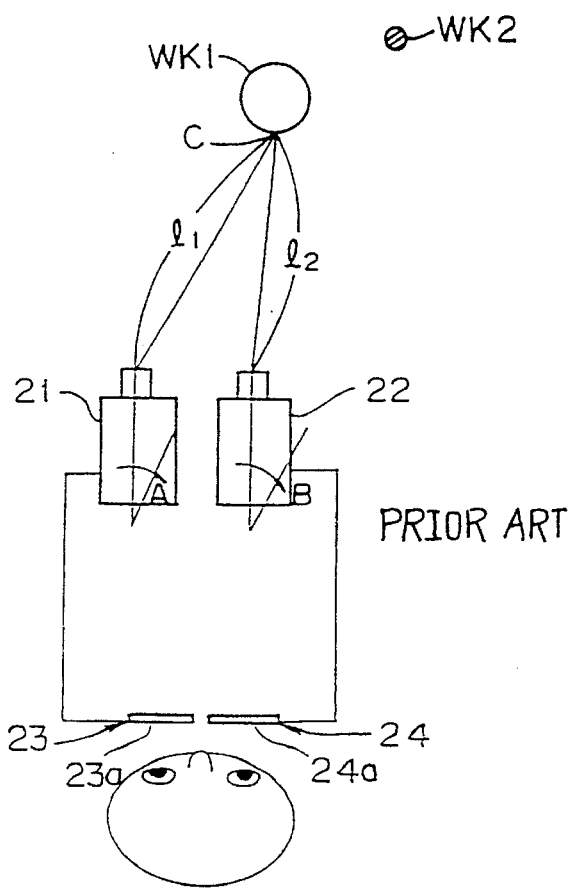
FIG. 5 is a diagram for explaining a prior art technique of visual examination of an object with use of a conventional visual apparatus.
Figure 6A:
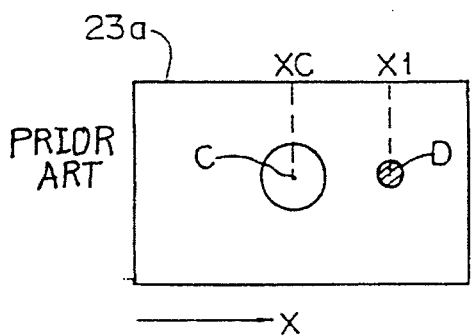
FIGS. 6(a) and 6(b) are diagrams for explaining the prior art technique, showing examples of images displayed on left and right display units in FIG. 5.
Figure 6B:
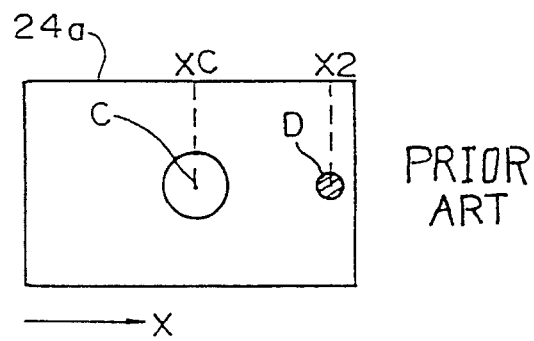

Eventually, the images which can be visually examined by the operator without the sense of inconsistency are displayed on the display units 1 and 2 as shown in FIG. 3(c), and thus the operator can perform remote operation or the like efficiently (step 108).

When it is judged at the step 103 that XR-XL≥0, the image of the right screen 2a is shifted to the left direction (step 104) and the right-end parts of the both screens 1a and 2a are darkened (step 105).

Meanwhile, when the right eye of the operator is the better-sighted eye (judged "right eye" in step 101), operations similar to those of the above steps 102 and 103 are carried out at steps 109 and 110, screen shifting operation and dark image processing are carried out according to judgment results (steps 111 and 112 or steps 113 and 114), and the processed left and right images are displayed on the left and right display units 1 and 2 (step 115).

Although the foregoing embodiment has been arranged so that the picture-taking directions of the left and right cameras 6 and 7 vary depending on the operator's head motion, it should be understood that this arrangement can be omitted in a case where a narrow eyesight causes no problem.

Industrial Applicability

As has been explained in the foregoing, in accordance with the present invention, there is provided a visual apparatus which, even when an operator observes a given position on a screen, allows the operator to visually examine an object without the sense of inconsistency and thus a working efficiency in a remote operation, etc. can be remarkably improved. Further, the visual apparatus can advantageously reduce its device cost because the apparatus can eliminate the need for performing distance measurement.

We claim:

1. An image processing apparatus in which images of an object picked up by left and right image-pick-up devices are displayed on respective screens of left and right display units for visual examination of said object displayed on the left and right screens by an operator's left and right eyes, said apparatus comprising:

visual examination position detection means for detecting respective visual examination positions on said left and right screens; and image processing means for specifying the object visually examined on the right and left screens based on the visual examination positions detected by the visual examination position detection means, fixing a position of the specified object on one screen of the left and right screens, and shifting an entire image including the specified object on the other screen of the left and right screens so that the specified object on said other screen is located at a position corresponding to the position fixed on said one screen.

2. An image processing apparatus as set forth in claim 1, wherein said visual examination position detection means comprises eye cameras.

3. An image processing apparatus as set forth in claim 1 wherein said image processing means performs processing for darkening part of said other screen on which said entire image has been shifted, said part being not displayed on said other screen before the image shifting and being displayed on said other screen as a result of the image shifting, and performs processing for darkening part of said one screen on which the position of the specified object has been fixed, said part corresponding to the darkened part of said other screen.

4. An image processing apparatus as set forth in claim 1, wherein said display units are attached to a head of a visually examining operator with use of predetermined supporting means in such a manner that distances between said screens and operator's left and right eyes are kept constant.

5. An image processing apparatus as set forth in claim 1, further comprising a heat motion sensor attached to a head of an operator visually examining said left and right screens for detecting a motion of the head to change directions of said image pick-up devices in response to the motion of the head detected by said head motion sensor.

6. An image processing apparatus as set forth in claim 1, wherein data on a better-sighted eye of an operator visually examining said left and right screens is inputted and a screen corresponding to said better-sighted eye indicated by said inputted data is determined as said one screen on which the position of the specified object is fixed.

\* \* \* \* \*